US009251091B2

(12) United States Patent
Hom et al.

(10) Patent No.: US 9,251,091 B2
(45) Date of Patent: Feb. 2, 2016

(54) TRANSLATION LOOK-ASIDE TABLE MANAGEMENT

(75) Inventors: David Hom, Poughkeepsie, NY (US); Paula M. Spens, Poughkeepsie, NY (US); Scott B. Tuttle, Staatsburg, NY (US); Elpida Tzortzatos, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 13/524,010

(22) Filed: Jun. 15, 2012

(65) Prior Publication Data

US 2013/0339655 A1 Dec. 19, 2013

(51) Int. Cl.
*G06F 12/00* (2006.01)
*G06F 12/10* (2006.01)
*G06F 12/14* (2006.01)

(52) U.S. Cl.
CPC .......... *G06F 12/1027* (2013.01); *G06F 12/145* (2013.01); *G06F 2212/683* (2013.01)

(58) Field of Classification Search
CPC ............ G06F 12/0888; G06F 12/0851; G06F 12/1027; G06F 12/109
USPC ........................................................ 711/207
See application file for complete search history.

(56) References Cited

U.S. PATENT DOCUMENTS

| 4,456,954 A | 6/1984 | Bullions et al. |
|---|---|---|
| 4,695,950 A | 9/1987 | Brandt et al. |
| 4,979,098 A | 12/1990 | Baum et al. |
| 5,574,936 A | 11/1996 | Ryba et al. |
| 6,854,046 B1 * | 2/2005 | Evans et al. .................... 711/203 |
| 7,111,145 B1 * | 9/2006 | Chen et al. .................... 711/206 |
| 7,409,487 B1 * | 8/2008 | Chen et al. ........................ 711/6 |
| 2003/0084256 A1 * | 5/2003 | McKee .......................... 711/152 |
| 2004/0143720 A1 * | 7/2004 | Mansell et al. ............... 711/206 |
| 2005/0268045 A1 * | 12/2005 | Slegel et al. ................... 711/133 |
| 2006/0271760 A1 * | 11/2006 | Nicolai .......................... 711/207 |
| 2008/0034179 A1 * | 2/2008 | Mewhinney et al. ......... 711/163 |
| 2012/0072669 A1 * | 3/2012 | Nishiguchi et al. ........... 711/135 |

OTHER PUBLICATIONS

Coscarella, et al. "System for Purging TLP", IPCOM000052724D, pp. 1-3, (1981).
Curran, et al. "Address-Translation Patching Mechanism" IPCOM000105436D, pp. 1-5, (1993).
Thompson et al., "Translation Lookaside Buffer Synchronization in a Multi-Processor System", Silicon Graphics, Incorporated. pp. 1-10 (1988).

* cited by examiner

*Primary Examiner* — Aimee Li
*Assistant Examiner* — Trang Ta
(74) *Attorney, Agent, or Firm* — Cantor Colburn LLP; William A. Kinnaman, Jr.

(57) ABSTRACT

A computer system includes a translation look-aside (TLB) buffer and a processing unit. The TLB is configured to store an entry that comprises virtual address information, real address information associated with the virtual address information, and additional information corresponding to at least one of the virtual address information and the real address information. The processing unit is configured to control the TLB to modify the additional information while maintaining the entry in a valid state accessible by the processing unit for a translation look-aside operation corresponding to the virtual address information and the real address information.

15 Claims, 6 Drawing Sheets

TRANSLATION LOOK-ASIDE TABLE MANAGEMENT

BACKGROUND

The present disclosure relates to managing entries of a translation look-aside buffer (TLB). In particular, the present invention relates to avoiding a complete TLB purge when modifying states of entries in a TLB, maintaining valid the TLB entries.

Real storage manager (RSM) routines administer the use of real storage and direct the movement of virtual pages between auxiliary storage and real storage. The RSM routines make all addressable virtual storage appear as real or physical storage to a user, while only the virtual pages necessary for execution are kept in real storage.

The RSM assigns real storage frames on request, associating virtual storage addresses with real storage addresses. To maintain the assignments, the RSM maintains data structures such as Region Tables, Segment Tables, and Page Tables for dynamic address translation (DAT). A translation look-aside buffer (TLB) contains virtual address-to-real address translations that may be accessed for quick lookups when a virtual address is referenced. When a referenced virtual address is not located in the TLB, the real address must be obtained by building a new virtual-to-real address translation.

When DAT information is changed, or when information related to virtual or real addresses is changed, TLB entries corresponding to the DAT information, as well as TLBs containing the TLB entries, are purged, such as with a Compare and Swap and Purge (CSP) instruction which updates the tables of the RSM and purges the TLB of each central processing unit (CPU) of a system. Purging the TLB results in longer processing times to obtain virtual-to-real address translations, since RSM will now have to build the virtual-to-real translations no longer residing in the TLB.

SUMMARY

Exemplary embodiments include a computer system having a translation look-aside (TLB) buffer and a processing unit. The TLB is configured to store an entry that comprises virtual address information, real address information associated with the virtual address information, and additional information corresponding to at least one of the virtual address information and the real address information. The processing unit is configured to control the TLB to modify the additional information while maintaining the entry in a valid state accessible by the processing unit for a translation look-aside operation corresponding to the virtual address information and the real address information.

Additional exemplary embodiments include a computer program product including a processing unit configured to perform a method. The method includes controlling a translation look-aside buffer (TLB) to modify additional information of a TLB entry that includes a virtual address, a real address corresponding to the virtual address, and the additional information corresponding to at least one of the virtual address and the real address. The processing unit controls the TLB to modify the additional information while maintaining the entry in a valid state accessible by the processing unit for a translation look-aside operation corresponding to the virtual address information and the real address information.

Further exemplary embodiments include a computer-implemented method. The method includes controlling, by a processing unit, a translation look-aside buffer (TLB) to modify additional information of a TLB entry that includes a virtual address, a real address corresponding to the virtual address, and the additional information corresponding to at least one of the virtual address and the real address. The TLB is controlled to modify the additional information while maintaining the entry in a valid state accessible by the processing unit for a translation look-aside operation corresponding to the virtual address information and the real address information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Purging all entries of a translation look-aside buffer (TLB) when changing one or more of the entries causes processing delays, since the virtual-to-real address translations must be built from structures in memory rather than retrieved from a buffer or cache memory. In exemplary embodiments, one or more entries of a TLB are changed without purging any entries of the TLB.

Figure 1:
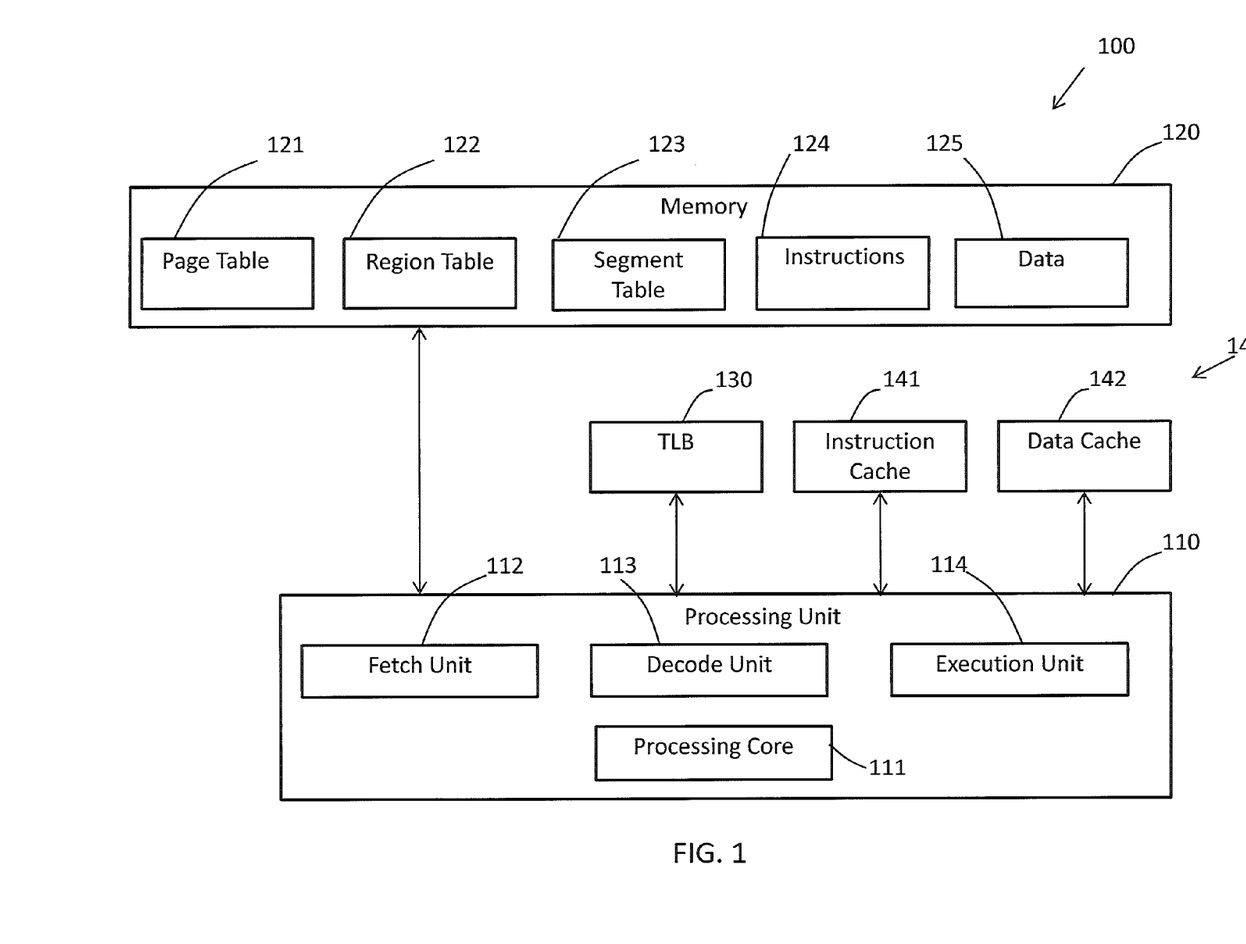
FIG. 1 illustrates a processing system according to an embodiment of the present disclosure.

FIG. 1 illustrates a block diagram of a processing system 100 according to an embodiment of the present disclosure. The processing system 100 includes a processing unit 110, memory 120, a translation look-aside buffer 130, and cache memory 140.

The processing unit 110 receives data, such as operand data, and instructions and executes the instructions. The processing unit 110 may include, for example, a processing core 111 including logic and other circuitry for processing data and instructions, a fetch unit 112 configured to fetch instructions, a decode unit 113 configured to decode instructions, and an execution unit 114 configured to execute the instructions. Although a few functional units of the processing unit 110 are illustrated for purposes of description, it is understood that the processing unit 110 may include additional functional units for retrieving, processing, and storing instructions and data.

The processing system 100 further includes memory 120 configured to store tables, such as a page table 121, region table 122, and segment table 123, as well as instructions 124 and data 125 which may be accessed and manipulated by the instructions 124. The page table 121, region table 122, and segment table 123 are collectively described as dynamic address translation (DAT) structures 121, 122, and 123. The memory 120 may include volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 may incorporate electronic, magnetic, optical, and/or other types of storage media. In some embodiments, the memory 120 may have a distributed architecture, where various components are situated remote from one another, but can be accessed by the processor processing unit 110.

The instruction cache 141 and the data cache 142 store instructions and data, respectively, for quick access by the processing unit 110 during execution of instructions. In operation, the fetch unit 112 fetches an instruction from memory 120 or from the instruction cache 141. The decode unit 113 reads the instruction and determines one or more virtual addresses referenced by the instruction. The decode unit 113 may access the TLB 130 for the virtual-to-real address translation. If the virtual-to-real address translation is not found in the TLB 130, the processing unit 110 may access one or more of the page table 121, region table 122, and segment table 123 to obtain a virtual-to-real address translation, or the processing unit 110 may build a new virtual-to-real address translation. Once a virtual-to-real address translation is built or accessed from one of the page table 121, region table 122, or the segment table 123, the virtual-to-real address translation may be stored in the TLB 130 for quick access. For example, accessing memory 120 by the processing unit 110 may require more operations than accessing the TLB 130, and data transmission times may be slower between the memory 120 and the processing unit 110 than between the TLB 130 and the processing unit 110.

Entries stored in the DAT structures 121, 122, and 123 and in the TLB 130 may include virtual addresses, real addresses corresponding to the virtual addresses, and additional information that categorizes or defines one or more of the virtual address and the real address or provides information to a processing unit about the real address or the virtual address. For example, in some cases an entry may include a status indicator that may be changed to modify a designated status of a corresponding real address. An address storing data may change from a read/write status to a read-only status, or vice versa. In some embodiments, a protect bit may be associated with an address stored in the TLB 130, and changing the state of the protect bit from a 1 to a 0 may alternate the state between making the address read only or read/write.

In some embodiments, subspaces may be partitioned within memory to designate portions of memory as being accessible by only certain programs, or to allow certain programs to only access limited portions of memory. Designating subspaces may involve changing values in the region table 122 and the TLB 130. In other words, each entry in the region table 122 and TLB 130 may include a predetermined number of bits set aside to designate one or more subspaces associated with the entry.

In embodiments of the present disclosure, data access states or other information associated with an address of DAT structures 121, 122, or 123 or entries in a TLB 130 may be changed without invalidating the entries in the DAT structures 121, 122, and 123 or TLB 130. For example, an entry in a DAT structure 121, 122, or 123 or in the TLB 130 may include a validity bit that indicates whether the address translation information is valid or has been changed. In addition, data access states or other information associated with an address of DAT structures 121, 122, or 123 or entries in a TLB 130 may be changed without purging the TLB 130. In the present disclosure and claims, changing data access states, characteristics, or classifications associated with addresses includes modifying information associated with the addresses that does not affect the address itself or the contents at that address. Although examples have been provided above related to read/write access and selective program access by generating subspaces in memory, it is understood that embodiments of the present disclosure encompass any classification, state, or characteristic that may be associated with an address to categorize the address or control access to the address without modifying the address or the contents located at the address.

While FIG. 1 illustrates for purposes of description a processing system 100 including one processing unit 110 one TLB 130 and one memory 110, embodiments of the present disclosure encompass any computing structure, including personal computing, server, and mainframe computing structures including multiple CPUs.

Figure 2:
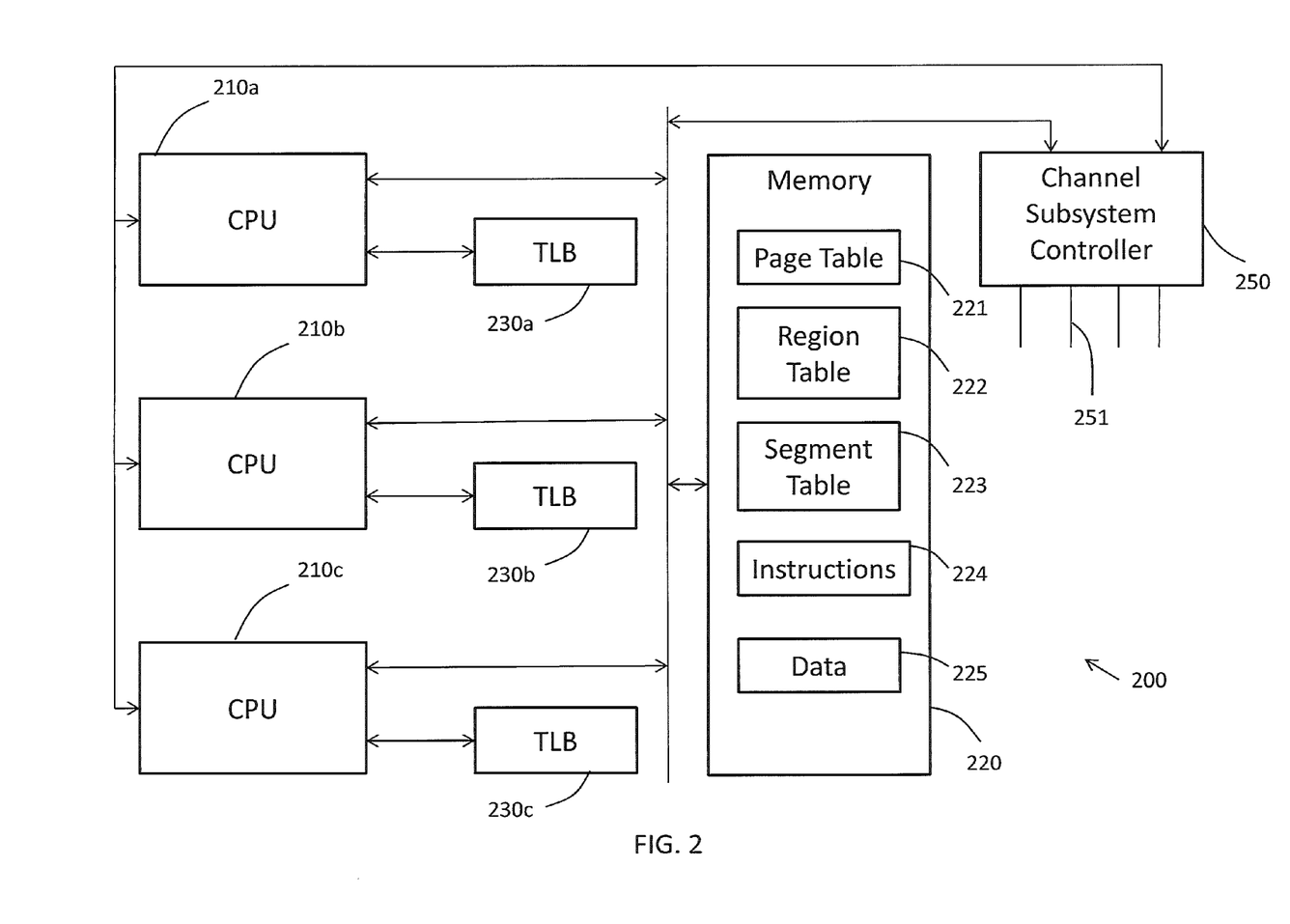
FIG. 2 illustrates a multi-CPU processing system according to one embodiment.

FIG. 2 illustrates a block diagram of a multi-CPU processing system 200 according to one embodiment of the present disclosure. The multi-CPU processing system 200 includes a plurality of CPUs 210a, 210b, and 210c, each associated with a respective translation look-aside buffer (TLB) 230a, 230b, and 230c. The CPUs 210a, 210b, and 210c may correspond to the processing unit 110 of FIG. 1, and the TLBs 230a, 230b, and 230c may correspond to the TLB 130 of FIG. 1. All of the CPUs 210a, 210b, and 210c access a same memory 220 to access one or more of a page table 221, region table 222, segment table 223, instructions 224, and data 225. The memory 220 may correspond to the memory 120 of FIG. 1. The page table 221, region table 222, and segment table 223 are identified collectively as DAT structures 221, 222, and 223. The CPUs 210a, 210b, and 210c are communicatively connected to a channel sub-system controller 250, which includes one or more output channels to communicate with external devices, including external control units, processors, storage units, media devices, displays, printing devices, servers, communication devices, user terminals, personal computers, or any other device capable of transmitting or receiving digital data to be processed by one or more of the CPUs 210a, 210b, or 210c, or to perform a particular function based on instructions from one or more of the CPUs 210a, 210b, and 210c.

While FIG. 2 illustrates a multi-CPU processing system 200 including a channel subsystem controller 250, in some embodiments, the CPUs 210a, 210b, and 210c may be connected directly to external devices via a bus. In other words, while FIG. 2 illustrates one example of a multi-CPU processing system 200, embodiments of the present disclosure encompass any system having multiple CPUs configured to communicate with one or more external devices.

In operation, one or more of the CPUs 210a, 210b, and 210c may receive a command via the channel subsystem controller 250, or by executing instructions 224, to change a data access state or other information associated with an address in an entry in the DAT structures 221, 222, or 223 and one or more of the TLBs 230a, 230b, and 230c. The data access state may define whether the address may be written to, read from, or may define one or more programs that may access the address. Other information associated with the address may include a page size, data type, or any other information located in an entry of the DAT structures 221, 222, or 223 and one of the TLBs 230*a*, 230*b*, and 230*c*. The information included in the entry and associated with the address is separate from the virtual and real addresses and does not affect the contents of data located at the address.

One of the CPUs 210*a*, 210*b*, or 210*c*, or an external controller connected to the channel subsystem controller 250 may provide an instruction to change a data access state or other information in each TLB 230*a*, 230*b*, and 230*c* when the information is changed in a corresponding entry in one or more of the DAT structures 221, 222, and 223. In embodiments of the present disclosure, the data access information or other information may be changed without purging entries of the TLBs 230*a*, 230*b*, and 230*c* or invalidating entries of the TLBs 230*a*, 230*b*, and 230*c*. The information may be changed by executing an instruction on one or more of the CPUs 210*a*, 210*b*, and 210*c*, such as a Compare and Replace DAT Table Entry (CRDTE) instruction.

Figure 3:
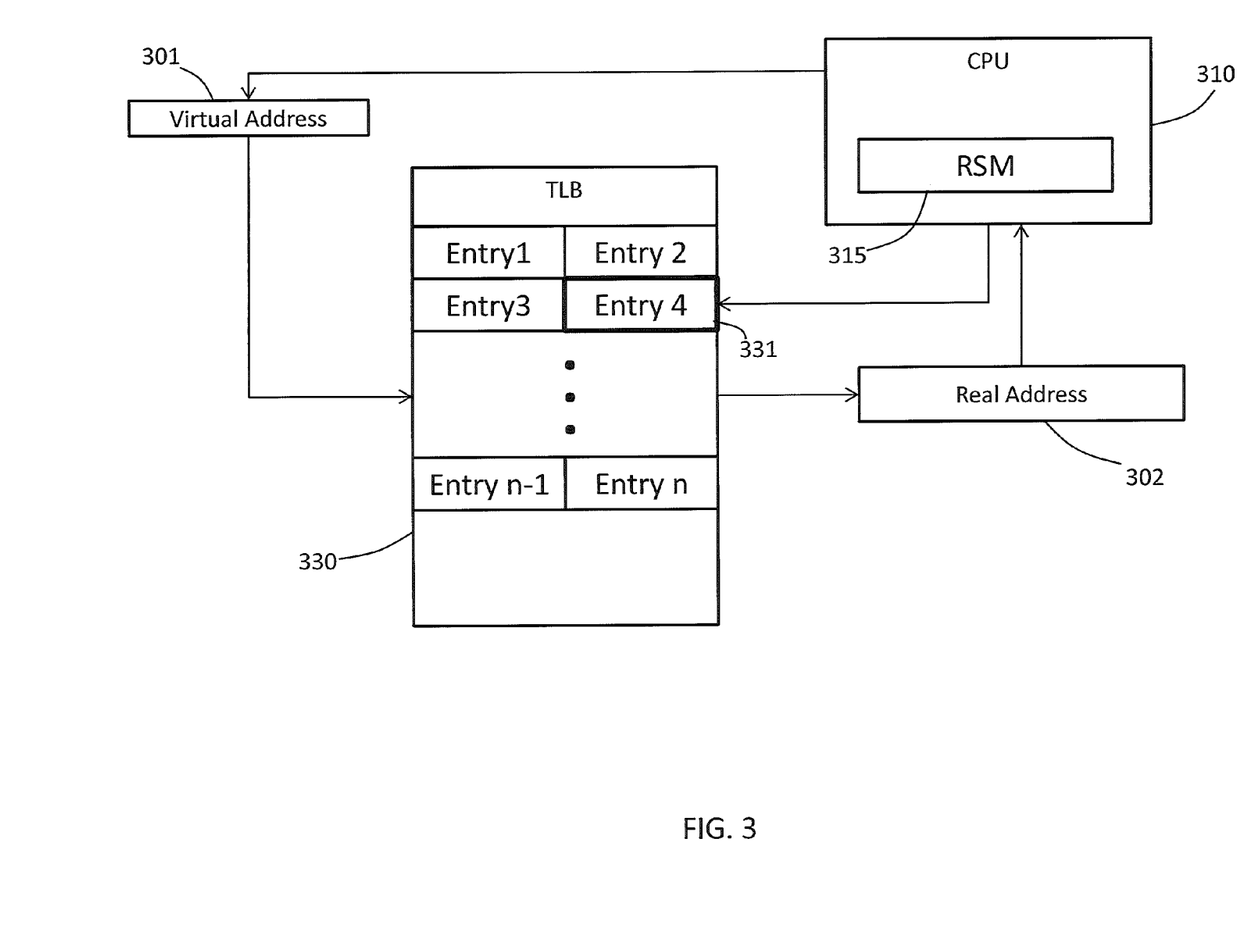
FIG. 3 illustrates a CPU and translation look-aside buffer according to one embodiment.

FIG. 3 illustrates a block diagram of a CPU 310 and TLB 330 according to an embodiment of the present disclosure. The CPU 310 may correspond to the processing unit 110 of FIG. 1, and the TLB 330 may correspond to the TLB 130 of FIG. 1. The CPU may include a real storage manager (RSM), or the RSM may comprise code executed by the CPU to manage DAT structures, such as DAT structures 121, 122, and 123 of FIG. 1. During normal operation, the CPU 310 references a virtual address 301 during processing of an instruction. The virtual address 301 is sent to the TLB 330 to determine whether a corresponding entry exists in the TLB 330 indicating a real address, or a physical memory location, associated with the virtual address. When such an entry exists, the real address 302 is provided to the CPU 310, along with any additional information in the entry, such as data access information, page size, etc.

The RSM 315 or other program may change information associated with an address of one or more entries of the DAT structures, such as DAT structures 121, 122, and 123 of FIG. 1. For example, a user or program may change a data access setting of an address to indicate that the address may only be used for a particular type of operation, such as a read operation, or by particular programs, so that one program may read and write but another may not read from or write to the address. When the RSM 315 changes the information associated with the address in a DAT structure, the RSM 315 also changes any entries corresponding to the address in the TLB 330. In embodiments of the present disclosure, the RSM 315, or the CPU 310, may modify information associated with the address in an entry 331 of the TLB 330 without invalidating the entry 331 or any other entries and without purging the entry 331 or any other entries. Accordingly, data processing times may be improved, since the TLB 330 need not be re-populated with addresses, and the CPU 310 may quickly access address translations. When the entry does not exist in the TLB 330, the RSM 315 may access the entry in a DAT table or may generate a new address translation to be stored in the DAT table and the TLB 330.

Figure 4:
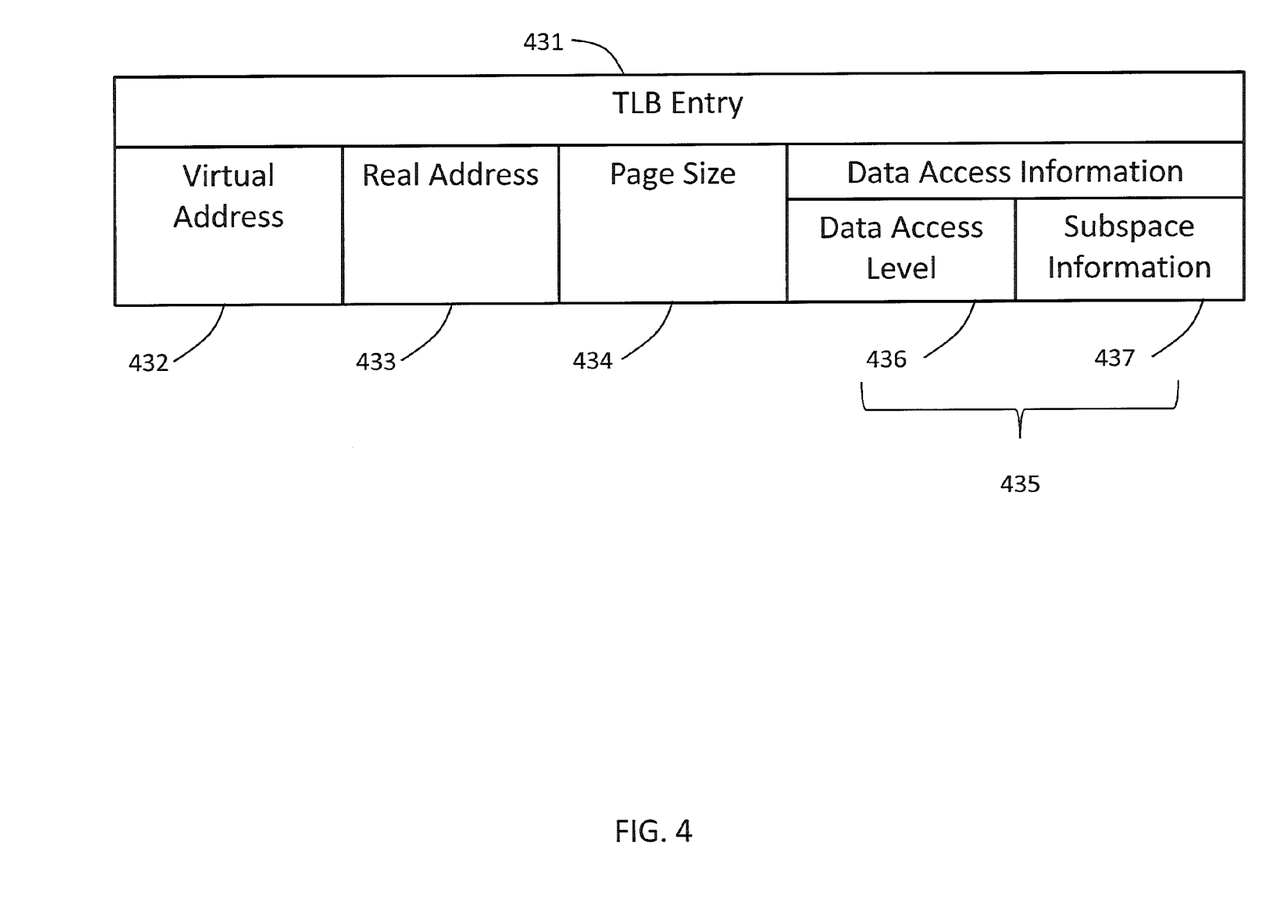
FIG. 4 illustrates a translation look-aside buffer entry according to one embodiment.

FIG. 4 illustrates an example of a TLB entry 431 according to an embodiment of the present disclosure. The TLB entry 431 may correspond to the TLB entry 331 of FIG. 3. The entry 431 may include a virtual address 432 and an associated real address 433. The entry 431 may also include additional information, such as a page size 434 and data access information 435. Examples of data access information 435 include data access levels 436, such as limiting data access to read-only or allowing read operations and write operations, and subspace information 437, which defines programs that may access the real address 433. Although some examples of additional information are provided by way of example, embodiments of the present disclosure encompass any additional information stored in an entry of a TLB, where the additional information is not the virtual address or the real address.

In embodiments of the present disclosure, information associated with an address that may be changed includes information that is associated with the address and not with the data stored in the address. For example, in one embodiment, the TLB entry 431 may include subspace information 437 that indicates only one type of program may access the data stored in the real address 433. In a series of operations, the data stored in the address may be moved to another location in which any program may access the data, and new data may be provided to the address, such that only the one type of program may access the new data. In such an embodiment, the subspace information 437 does not apply to data moved from the real address 433. Instead, the setting indicated by the subspace information 437 remains associated with the address regardless of the data that is provided to or removed from the address. Similarly, if the additional information of a TLB entry indicates that a real address may only be subject to a read operation, the data may be read from the real address and loaded into another address which may be subject to both read and write operations. In such a case, the data that has been stored in another address may be over-written, while the same data stored in the real address indicated by the TLB entry may only be read.

Figure 5:
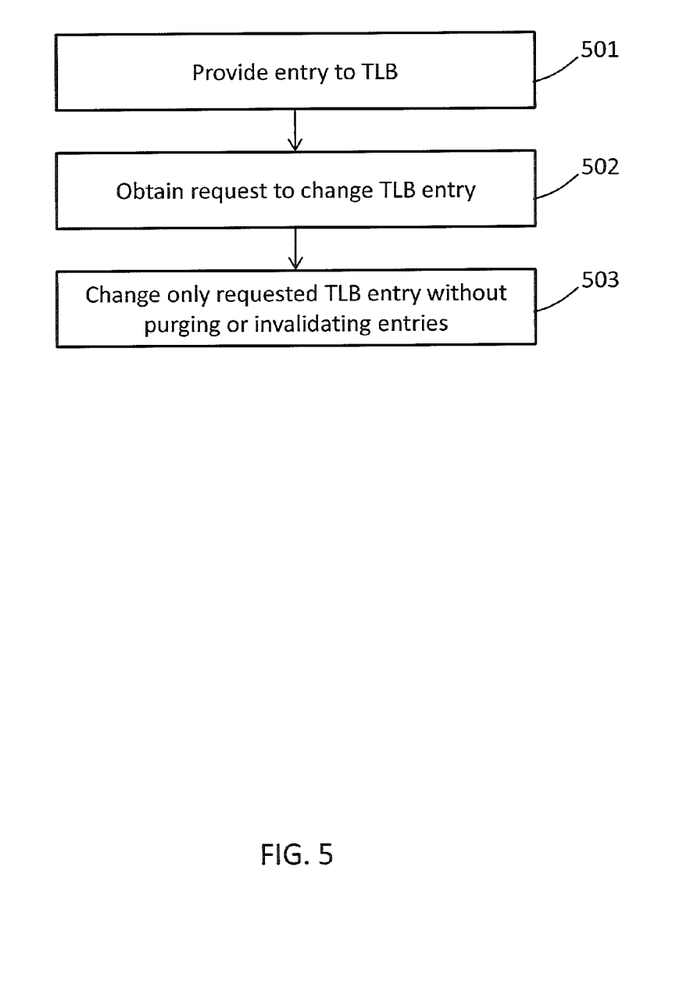
FIG. 5 illustrates a flow chart of a method according to one embodiment.

FIG. 5 illustrates a flowchart of a method according to an embodiment of the present disclosure. In block 501, one or more entries are provided to a translation look-aside buffer (TLB). In particular, a CPU may process an instruction referencing a virtual address. The CPU may access a dynamic address translation (DAT) table to determine a real address corresponding to the virtual address, or the CPU may build a new DAT associating a real address with the virtual address. The CPU may then provide the address translation to the TLB to reduce the time needed to look up the real address the next time the virtual address is referenced.

In block 502, a request to change additional information, other than a real or virtual address, in a TLB entry is received. For example, a real storage manager (RSM) may change information associated with an address in an entry of a DAT structure. The RSM may then provide a request to the CPU to change a TLB entry associated with the address so that the information in the TLB corresponds to the information in the DAT structure. The information associated with the address in the entry may be stored together with the address in the entry and may be separate information from the address. For example, the information may be data access information, subspace information or any other type of information that is associated with the address but does not alter the contents of the address.

In block 503, the CPU may generate an instruction to change the TLB entry without purging or invalidating any of the entries of the TLB. The instruction may be a hardware instruction that changes only the information associated with the address, without changing the address or the contents stored at the address. In one embodiment in which a system includes multiple CPUs accessing one main memory, the instruction may change the information associated with the address in each TLB associated with each respective CPU.

Figure 6:
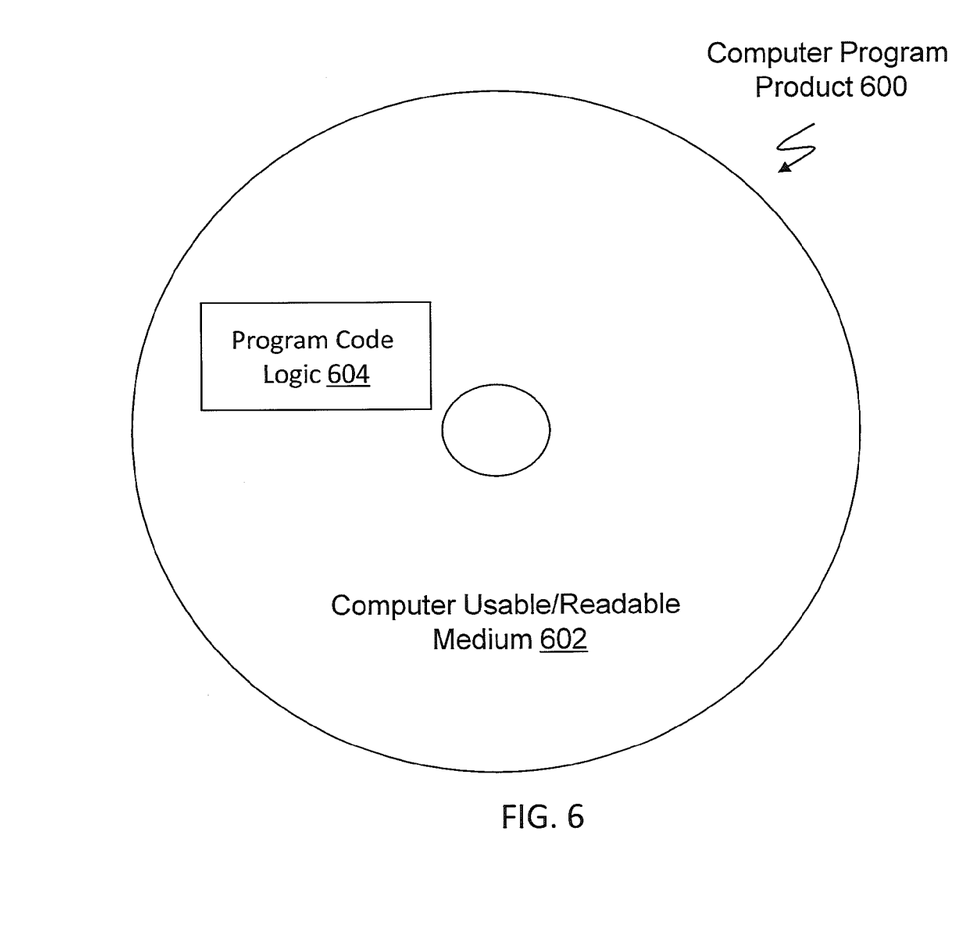
FIG. 6 illustrates a computer-readable medium according to one embodiment.

As described above, embodiments can be embodied in the form of computer-implemented processes and apparatuses for practicing those processes. An embodiment may include a computer program product 600 as depicted in FIG. 6 on a computer readable/usable medium 602 with computer program code logic 604 containing instructions embodied in tangible media as an article of manufacture. Exemplary articles of manufacture for computer readable/usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing embodiments of the invention. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing embodiments of the invention. When implemented on a general-purpose microprocessor, the computer program code logic 604 segments configure the microprocessor to create specific logic circuits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While preferred embodiments are described above, it will be understood that those skilled in the art, both now and in the future, may make various improvements and enhancements which fall within the scope of the claims which follow.

What is claimed is:

1. A computer system, comprising:
   a translation look-aside buffer (TLB) configured to store an entry that comprises virtual address information, real address information associated with the virtual address information, and additional information corresponding to at least one of the virtual address information and the real address information and being information regarding an access level of the real address when the additional information corresponds to the real address information; and
   a processing unit configured to control the TLB to modify the additional information while maintaining the entry in a valid state accessible by the processing unit for a translation look-aside operation corresponding to the virtual address information and the real address information without purging the entire TLB.

2. The computer system of claim 1, wherein the additional information corresponds to a read or write permission of the real address when the additional information corresponds to the real address information.

3. The computer system of claim 1, wherein the additional information corresponds to a subspace associated with the real address.

4. The computer system of claim 1, wherein the processing unit comprises a plurality of processing units,
   the TLB includes a plurality of TLBs, each TLB corresponding to a respective one of the plurality of processing units, and one or more of the plurality of TLBs including the entry that comprises the virtual address information, real address information associated with the virtual address information, and additional information corresponding to at least one of the virtual address information and the real address information, and
   the plurality of processing units is configured to control each of the one or more of the plurality of TLBs to modify the additional information in each of the one or more of the plurality of TLBs while maintaining the entry in a valid state accessible by the processing unit for a translation look-aside operation corresponding to the virtual address information and the real address information.

5. The computer system of claim 1, further comprising:
   memory having stored therein one or more dynamic address translation (DAT) structures,
   wherein the processing unit is configured to update a DAT entry in the one or more DAT structures, and the processing unit is configured to modify the entry in the TLB to include additional information corresponding to additional information of the DAT entry.

6. A computer program product comprising:
   a non-transitory computer readable storage medium having computer readable instructions stored thereon that, when executed by a processing unit implements a method, comprising:
   controlling a translation look-aside buffer (TLB) to modify additional information of a TLB entry that includes a virtual address, a real address corresponding to the virtual address, and the additional information corresponding to at least one of the virtual address and the real address and being information regarding an access level of the real address when the additional information corresponds to the real address, the TLB controlled to modify the additional information while maintaining the entry in a valid state accessible by the processing unit for a translation look-aside operation corresponding to the virtual address information and the real address information without purging the entire TLB.

7. The computer program product of claim 6, wherein the additional information corresponds to a read or write permission of the real address.

8. The computer program product of claim 6, wherein the additional information corresponds to a subspace associated with the real address.

9. The computer program product of claim 6, wherein the processing unit comprises a plurality of processing units,
   each one of the plurality of processing units corresponds to a respective TLB,
   two or more of the respective TLBs includes the entry, and
   controlling the TLB includes controlling, by each one of the plurality of processing units corresponding to the two or more of the respective TLBs, additional information of the entry in each one of the two or more of the respective TLBs.

10. The computer program product of claim 6, wherein the processing unit is configured to update dynamic address translation (DAT) data in one or more DAT structures stored in memory, and
    the processing unit is configured to modify the entry in the TLB to include additional information corresponding to additional information of a DAT entry in the one or more DAT structures.

11. A computer-implemented method, comprising:
    controlling, by a processing unit, a translation look-aside buffer (TLB) to modify additional information of a TLB entry that includes a virtual address, a real address corresponding to the virtual address, and the additional information corresponding to at least one of the virtual address and the real address and being information regarding an access level of the real address, the TLB controlled to modify the additional information while maintaining the entry in a valid state accessible by the processing unit for a translation look-aside operation corresponding to the virtual address information and the real address information without purging the entire TLB.

12. The method of claim 11, wherein the additional information corresponds to a read or write permission of the real address.

13. The method of claim 11, wherein the additional information corresponds to a subspace associated with the real address.

14. The method of claim 11, wherein the processing unit comprises a plurality of processing units,
 each one of the plurality of processing units corresponds to a respective TLB,
 two or more of the respective TLBs includes the TLB entry, and
 controlling the TLB includes controlling, by each one of the plurality of processing units corresponding to the two or more of the respective TLBs, additional information of the TLB entry in each one of the two or more of the respective TLBs.

15. The method of claim 11, further comprising:
 updating, with the processing unit, dynamic address translation (DAT) data in one or more DAT structures stored in memory; and
modifying the TLB entry to include additional information corresponding to additional information in the one or more DAT structures.

\* \* \* \* \*